US008132976B2

(12) United States Patent
Odell et al.

(10) Patent No.: US 8,132,976 B2
(45) Date of Patent: Mar. 13, 2012

(54) REDUCED IMPACT KEYBOARD WITH CUSHIONED KEYS

(75) Inventors: Dan Odell, Kirkland, WA (US); Krishna Darbha, Seattle, WA (US); Richard E. Compton, Lake Forest Park, WA (US); Glen C. Larsen, Issaquah, WA (US); Kurt Allen Jenkins, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 691 days.

(21) Appl. No.: 11/950,439

(22) Filed: Dec. 5, 2007

(65) Prior Publication Data

US 2009/0148219 A1    Jun. 11, 2009

(51) Int. Cl.
*B41J 5/12* (2006.01)

(52) U.S. Cl. ........................................... 400/491

(58) Field of Classification Search ............ 400/491
See application file for complete search history.

(56) References Cited

U.S. PATENT DOCUMENTS

| 705,709 | A | * | 7/1902 | Savell | 400/491 |
| 832,617 | A | * | 10/1906 | Munson et al. | 400/491 |
| 971,221 | A | * | 9/1910 | Shepard | 400/491 |
| 974,488 | A | * | 11/1910 | Hay | 400/491 |
| 1,970,793 | A | * | 8/1934 | Amis | 400/491 |
| 2,040,424 | A | * | 5/1936 | Benner | 400/491 |
| 2,059,882 | A | * | 11/1936 | Linsky | 400/491 |
| 2,069,829 | A | * | 2/1937 | Helmond | 400/491 |
| 2,102,526 | A | * | 12/1937 | Guilfoyle | 400/488 |
| 2,181,955 | A | * | 12/1939 | Ward, Jr. | 400/491 |
| 4,500,218 | A | * | 2/1985 | Nishikawa | 400/490 |
| 5,290,115 | A |   | 3/1994 | Little |  |
| 5,612,692 | A | * | 3/1997 | Dugas et al. | 341/22 |
| 5,813,777 | A |   | 9/1998 | Bonnstauffer |  |
| 5,933,133 | A |   | 8/1999 | Lohr |  |
| 6,379,061 | B1 | * | 4/2002 | Liao | 400/491 |
| 6,497,521 | B1 |   | 12/2002 | Lohr |  |
| 6,724,369 | B2 |   | 4/2004 | Slotta |  |
| 6,962,452 | B2 |   | 11/2005 | Cheng |  |
| 6,967,056 | B2 | * | 11/2005 | Kashino | 428/189 |
| 7,040,824 | B2 |   | 5/2006 | Schaffner |  |
| 7,182,533 | B1 |   | 2/2007 | Caplan |  |
| 2005/0281605 | A1 | * | 12/2005 | Dombrowski et al. | 400/491 |

FOREIGN PATENT DOCUMENTS

WO    WO02093603    11/2002

OTHER PUBLICATIONS

Lytle, "Levitating Keyboard Uses Magnets to Float Keys", Digital World Tokyo, 2006-2007, pp. 1-4.

* cited by examiner

*Primary Examiner* — Jill Culler
(74) *Attorney, Agent, or Firm* — Alleman Hall McCoy Russell & Tuttle LLP

(57) ABSTRACT

A keyboard for use with a computing device and a method of manufacturing a keyboard key are provided. One disclosed keyboard includes a plurality of keys, each key having a key cap including a perimeter wall and a void positioned within the perimeter wall and opening to a top of the key cap. Each key further includes a cushion having a top portion configured to be contacted by a digit of a user and a bottom portion configured to be fitted within the void in the key cap. The cushion being may be configured to absorb an impact force directed against the key during a keystroke.

19 Claims, 5 Drawing Sheets

REDUCED IMPACT KEYBOARD WITH CUSHIONED KEYS

BACKGROUND

Overuse of computer keyboards can cause discomfort in the fingers of users. During a typical keystroke on a keyboard of a computing device, the key bottoms out against a solid surface after actuating a key switch. This can cause a force spike during deceleration of the key. Since the duration of deceleration is short, the deceleration forces may be several times higher than the acceleration forces encountered at the beginning of the keystroke.

High force can cause discomfort to the user, which can negatively impact the user experience, and potentially reduce productivity. In addition, high force is one of the main risk factors for musculoskeletal pain and disorders. Further, high impulse loads may be damaging to the soft tissues of the body. Finally, when the key is bottomed out, the user's finger may be pressing eccentrically (i.e., the joint is moving away from direction in which muscle force is being applied) or isometrically (i.e., force with no movement) against the key, which can be a damaging type of loading.

SUMMARY

A keyboard for use with a computing device and a method of manufacturing a keyboard key are provided. One disclosed keyboard includes a plurality of keys, each key having a key cap including a perimeter wall and a void positioned within the perimeter wall and opening to a top of the key cap. Each key further includes a cushion having a top portion configured to be contacted by a digit of a user and a bottom portion configured to be fitted within the void in the key cap. The cushion being may be configured to absorb an impact force directed against the key during a keystroke.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
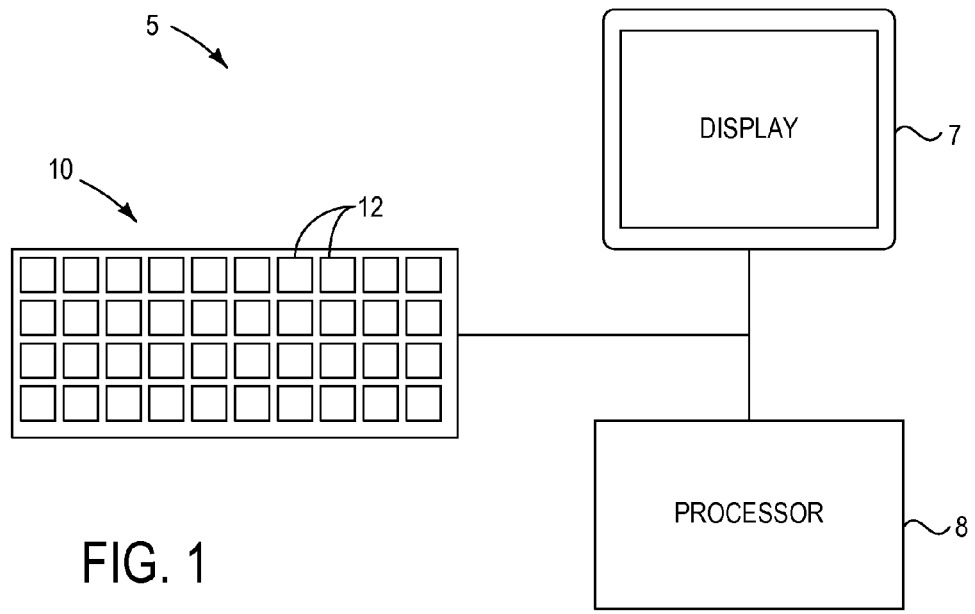
FIG. 1 is a schematic view of one embodiment of a keyboard for use with a computing device.

FIG. 1 illustrates a computing device 5 having an associated display 7, processor 8, and a keyboard 10. Computing device 5 may for example be a personal computer and keyboard 10 may include a plurality of keys 12 arranged in a suitable layout, such as a QWERTY layout. Alternatively, computing device 5 may be an automated teller machine, computer game, computer kiosk, or other computing device, and keyboard 10 may be a numeric keyboard or other special purpose keyboard.

Figure 2:
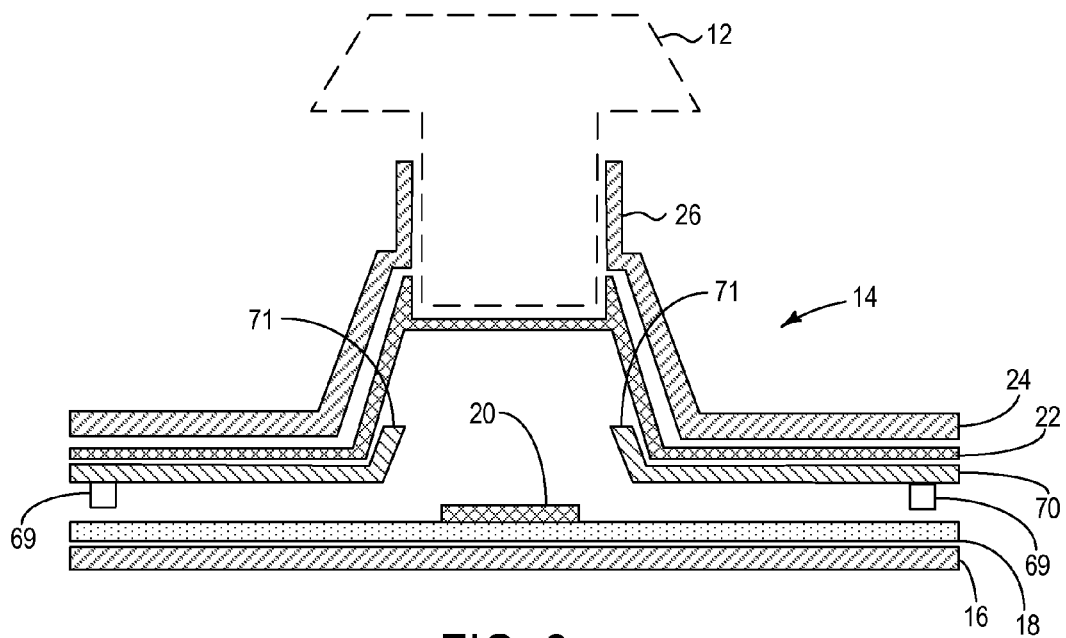
FIG. 2 is a cross-sectional side view illustrating a key and associated key switch assembly of the keyboard of FIG. 1.

As shown in FIG. 2, for each key 12, keyboard 10 includes an associated switch assembly 14 having a substrate 16, a printed circuit board 18 with a key switch 20 formed thereon, a membrane 22 and an upper layer 24 including a guide structure 26 configured to receive the key 12. It will be appreciated that the substrate 16 and upper layer 24 may be joined to collectively form a housing for the keyboard. It will also be appreciated that other configurations and variations of the keys in the keyboard can be constructed with components common or different to those shown in FIG. 2.

The membrane 22 may be constructed of a resilient deformable material, such as silicone, to provide an upward spring force to maintain the key 12 in a raised configuration, as shown, when not depressed by a user. Upon depression of the key 12 by a user, the membrane is configured to deform and come into contact with the key switch 20 of the printed circuit board 18. When the membrane 22 comes into contact with the key switch 20, the key switch 20 is actuated, causing the associated processor in the keyboard 10 to output a signal to the computing device 5, which identifies that a specific key has been depressed.

Figure 3:
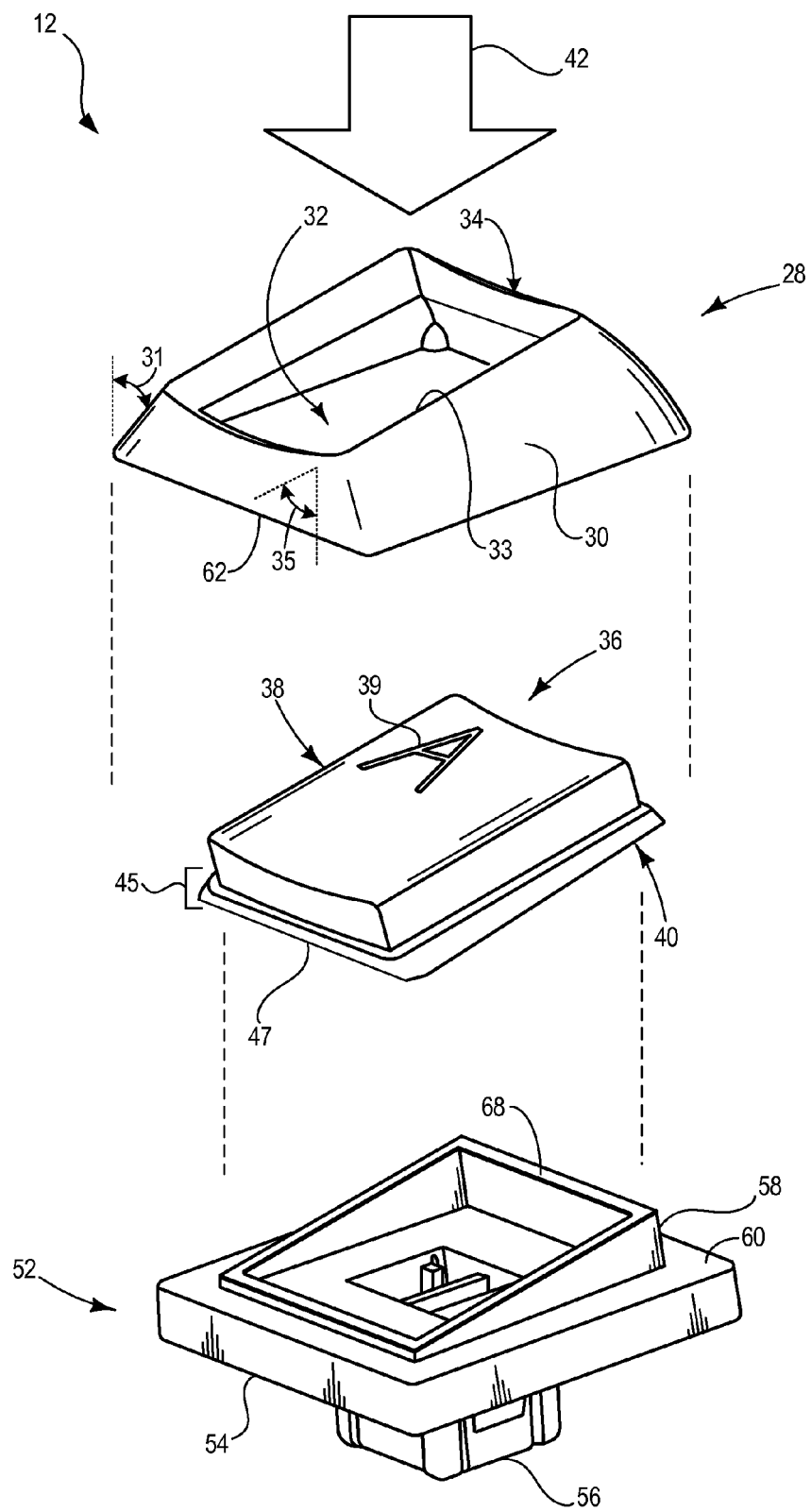
FIG. 3 is an exploded perspective view illustrating components of a key of the keyboard of FIG. 1.

As shown in FIG. 3, each of the keys 12 may include a key cap 28 with a perimeter wall 30 and a void 32 positioned within the perimeter wall 30 and opening to a top 34 of the key cap. One or more of the sides of the perimeter wall 30 may be formed at an angle 31 that is angled inward toward a top 34 of the key cap. The top 34 of the key cap may be defined by edges 33 of the perimeter wall that are formed at an angle 35 that is angled forward or backward, to thereby orient the top of the key to a desired orientation.

Each key 12 may further include a cushion 36 having a top portion 38 configured to be contacted by a digit of a user, and a bottom portion 40 configured to be fitted within the void 32. The cushion 36 is configured to absorb an impact force 42 directed against the key 12 during a keystroke.

Figure 4:
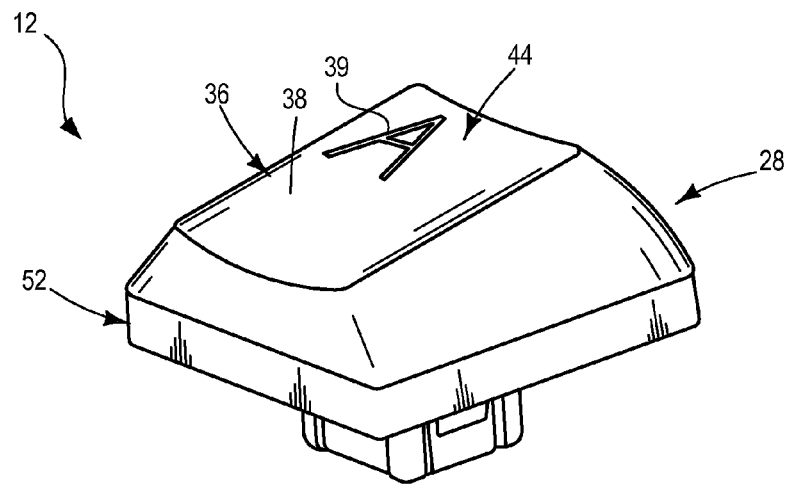
FIG. 4 is a perspective view illustrating the key of FIG. 3 with components assembled.

As shown in FIG. 4, when assembled, the top portion 38 of the cushion 36 many extend to cover substantially an entire top surface of the key 12. The top portion 38 of the cushion 36 may further include a concavity 44 to accommodate the curve of the digit of a user. The top portion 38 of the cushion 36 may include indicia 39 positioned thereon, to represent, for example, a character or function assigned to the key 12. In the depicted embodiment, the indicia 39 is the letter "A"; however it will be appreciated that the indicia may be any suitable marking that visually indicates to the user the character for the key or the function the key performs.

Figure 11:
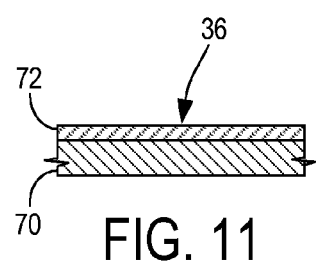
FIG. 11 is a partial cross sectional view of another embodiment of a cushion, including a base layer and a surface layer.

The cushion 36 may be formed of an elastomeric material, such as thermoplastic polyurethane (TPU), thermoplastic olefin (TPO), thermoplastic elastomer, and/or elastomeric silicone. The elastomeric material may be in solid form, or in the form of a compressible foam. In some embodiments, the cushion may include a fluid filled bladder, shown in FIG. 18, which may be surrounded by solid material or compressible foam material. The fluid in the bladder may be a gas, such as air, or a liquid, such as a gel. Further, as shown in FIG. 11, in some embodiments the elastomeric material may be formed in a base layer 70 of the cushion 36, upon which a surface layer 72 is formed. The surface layer 72 may be formed of a material with a harder surface than the elastomeric material. The relative hardness of the surface layer 72 may give the keys a more comfortable feel to some users, and may be suitable for printing indicia 39. It will be appreciated that the surface layer 72 may be formed across an entire top surface 38 of the cushion 36, or alternatively may cover only a portion of the top surface 38 where fingers contact the surface or where indicia 39 are printed, for example.

Figure 5A:
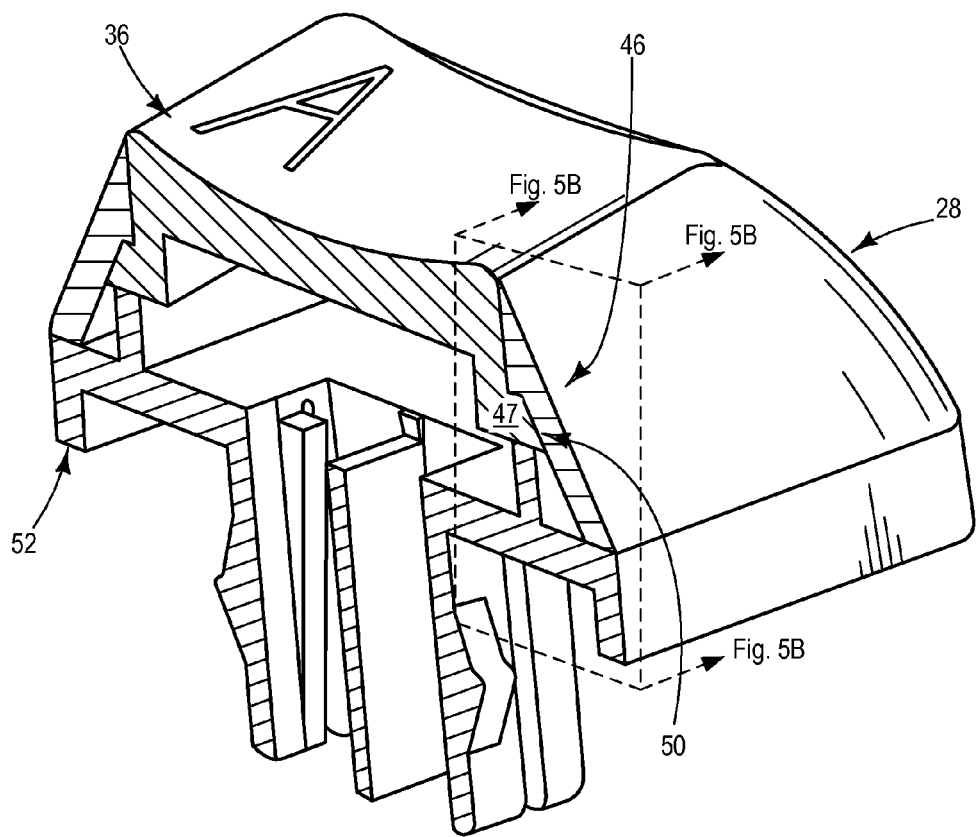
FIG. 5A is a cutaway perspective view illustrating an internal structure of the assembled key of FIG. 4.

Now referring to FIG. 3, the bottom portion 40 of the cushion 36 may include a mounting portion 45 configured to extend downward from the top portion 38 into the void 32 to secure the cushion 36 to the key cap 28. As shown generally in FIG. 5A and in detail in FIG. 5B, the mounting portion 45 may be secured to the key cap 28 by a tongue and groove connection 46. The mounting portion 45 may include a flange 47 extending outward from a bottom of the mounting portion 45, and the perimeter wall 30 of the key cap 28 may include an undercut that at least partially defines a groove 50. The tongue and groove connection 46 may be formed by the coupling of the flange 47 with the groove 50.

Figure 5B:
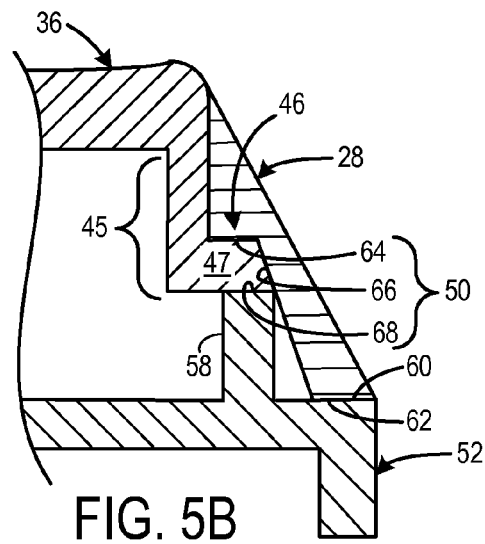
FIG. 5B is a detail, partial cross sectional view of the assembled key taken as indicated in FIG. 5A.

Referring again to FIG. 3, the key may further include a post structure 52 having a base portion 54 from which a post portion 56 extends downwardly, and from which a support portion 58 extends upwardly. The base portion 56 may also include an upper surface 60 configured to contact a lower edge 62 of the perimeter wall 30, as shown in FIG. 5B. An inside of the perimeter wall 30 of the key cap 28 defines a top side 64 and an outside 66 of the groove 50 and an upper surface 68 of the support portion 58 defines a bottom side of the groove 50, as shown in FIG. 5B. Although in the depicted embodiment the tongue and groove connection is formed by a tongue connected to the cushion 36 and a groove formed by the key cap 28 and post structure 52, it will be appreciated that alternatively the tongue may be formed on the key cap and/or base portion and the groove may be formed on the cushion.

Now referring to FIG. 2, the key 12 may include an associated light source 69 positioned below the key. Light source 69 may be a Light Emitting Diode LED, or other suitable light source. The cushion 36 and membrane 22 may be at least partially formed of a translucent material. The light source 69 positioned below the membrane 22 may be configured to project light through an optical waveguide 70, out a shaped tip of the waveguide 71, through the translucent material of the membrane 22, and through the translucent material of the cushion 36. In this way, the user may view light emitted through cushion 36 of each key 12.

Figure 6:
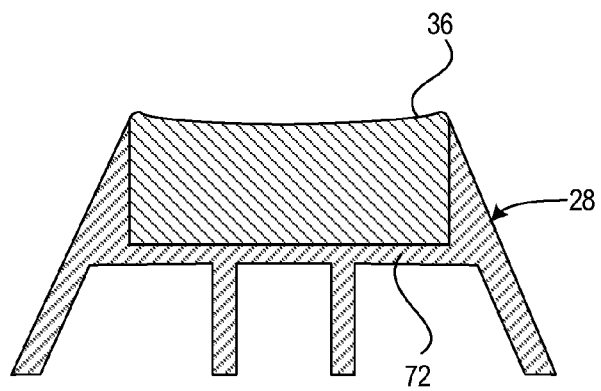
FIG. 6 is a cross sectional view of an embodiment of a key, featuring a cushion and key cap that have been manufactured by a co-molding process.
Figure 7:
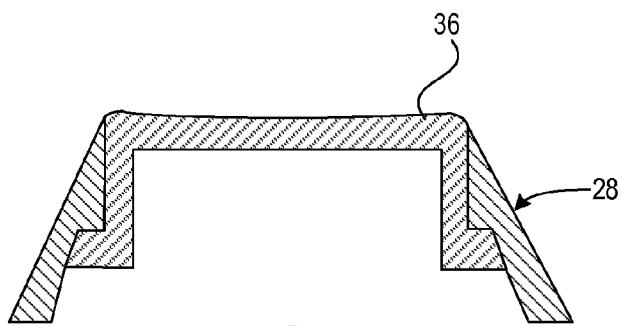
FIG. 7 is a cross sectional view of another embodiment of a key, featuring a cushion and key cap that have been manufactured by a co-molding process.

In the embodiments illustrated in FIGS. 3-5B, the cushion 36 and key cap 28 are molded separately. After the cushion 36 and key cap 28 are molded, they may be assembled to form a key cap cushion assembly, which in turn is assembled to the post structure 52 to form the key 12. Alternatively, the cushion 36 and key cap 28 may be co-molded to integrally form a key-cap cushion assembly, shown in FIG. 7. As yet another alternative, as shown in FIG. 6, the key cap 28 and post structure 52 may be molded as a unitary part and the cushion 36 may be co-molded with the unitary part to form key 12. In this embodiment, a floor 72 may be provided adjacent a bottom of the void 32, in order to contain the cushion material that forms the cushion 36, and provide support for the cushion 36 during use.

Figure 9:
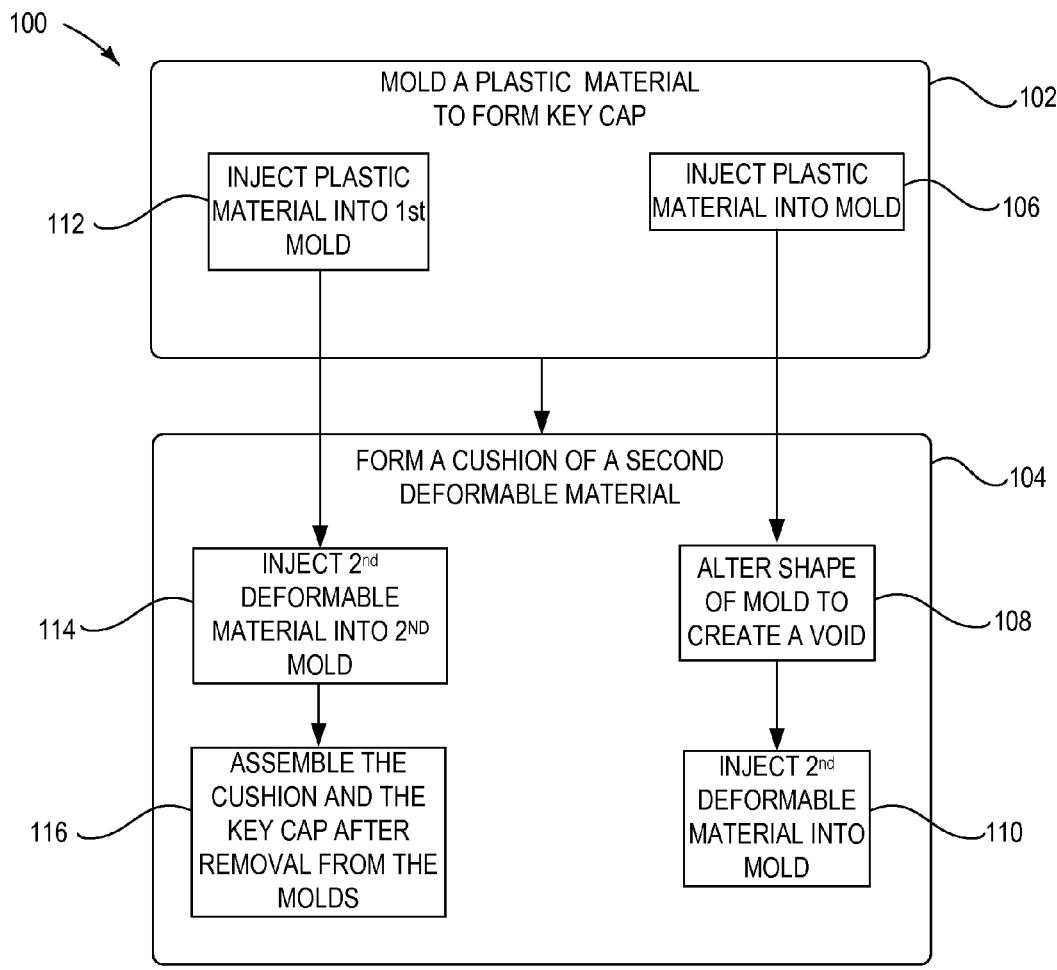
FIG. 9 is a flowchart illustrating an embodiment of a method for manufacturing a key of a keyboard of a computing device.

One embodiment of a method 100 for manufacturing a key for a keyboard for a computing device is shown in FIG. 9. At 102, the method may include molding a first plastic material to form a key cap of a key. The key cap may be molded to include a perimeter wall and a void positioned inside the perimeter wall, the void opening to a top of a key cap. At 104, the method may include forming a cushion of a second deformable material at least partially within the void in the key cap, the cushion being formed to have a top portion configured to be contacted by a digit of a user, and a bottom portion configured to be fitted within the void. The second deformable material may be an elastomeric material such as thermoplastic polyurethane (TPU), thermoplastic olefin (TPO), thermoplastic elastomers, elastomeric silicone, and may be formed as a solid, a compressible foam, and further may have one or more fluid filled bladders, as discussed above.

As illustrated at 106, molding of the first plastic material to form a key cap may include injecting the first plastic material into a mold to form the key cap with a perimeter wall. As illustrated at 108, forming the cushion of the second deformable material may include altering the shape of the mold to create the void inside the perimeter wall. As illustrated at 110, the method may further include injecting the second deformable material into the mold to form the cushion substantially filling the void inside the perimeter wall.

Alternatively, as illustrated at 112, molding a first plastic material to form a key cap may include injecting the first plastic material into a first mold to form the key cap with the perimeter wall. As illustrated at 114, forming the cushion of the second deformable material may include injecting the second deformable material into a second mold to form the cushion that is sized to substantially fill the void inside the perimeter wall of the key cap. As illustrated at 116, the method may further include assembling the cushion and the key cap after they have been removed from the first and second molds, to position the cushion such that the second deformable material of the cushion substantially covers a top portion of the key.

Figure 10:
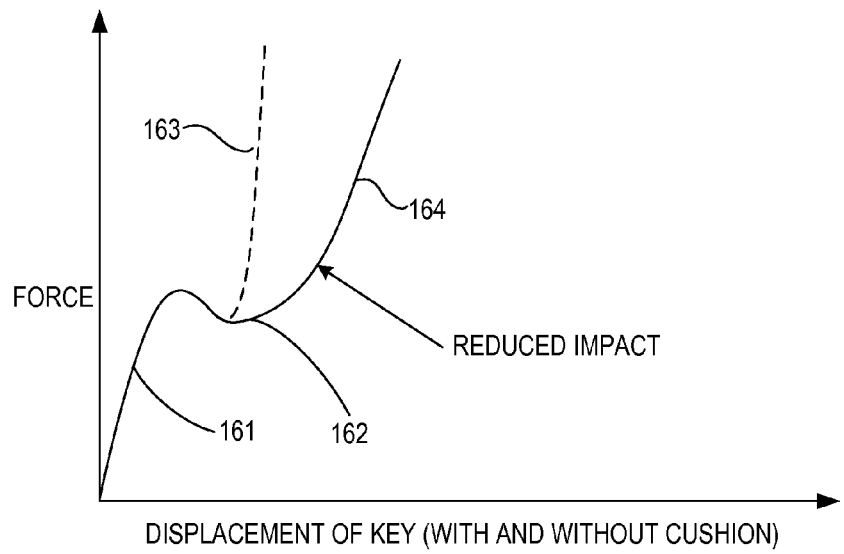
FIG. 10 is a graph of force vs. displacement during a keystroke on a key of the keyboard of FIG. 1.

FIG. 10 illustrates a force vs. displacement graph representing the force that a digit of a user may experience during depression of a key with and without a cushion as described above. Initial depression segment 161 represents the initial depression of the key by the user, during which increasing displacement is achieved by less and less force. Key switch depression segment 162 represents a depression of the key switch, during which an initial drop in force is followed by a spike in force. Uncushioned bottoming out segment 163, in dashed lines, represents a period during which the key bottoms out on a substrate, after depressing the key switch, without any cushion, as in prior art keyboards. A substantial force spike is felt where the dashed line sharply turns vertical. In contrast, cushioned bottoming out segment 164 represents a period during which the key with a cushion 36 as described above, bottoms out. The force experienced by the digit of the user is dampened in the region where the force/displacement curve gently turns upward, as the top portion of the key with a cushion is displaced further than the top portion of a key without a cushion. Reducing the impact force experienced by the digit of a user in this region has the potential advantage of reducing discomfort and injury due to overuse of keyboards during computing activities.

It will be appreciated that the computing devices described herein may be any suitable computing device configured to execute the programs and display the graphical user interfaces described herein. For example, the computing devices may be a personal computer, automated teller machine, computer game, computer kiosk laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in memory using portions of volatile memory and the processor.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A keyboard for use with a computing device, the keyboard comprising:
   a plurality of keys, each key including:
      a key cap including a perimeter wall and a void positioned within the perimeter wall and opening to a top of the key cap, the perimeter wall including four sides;
      a cushion having a top portion configured to be contacted by a digit of a user, and a bottom portion configured to be fitted within the void, the cushion being configured to absorb an impact force directed against the key during a keystroke, the cushion formed in an upside down U shape having two extensions protruding from the top portion in cross section and being unsupported in a middle region to enable downward deflection of a bottom surface of the cushion, the two extensions being adjacent to an inner periphery of the perimeter wall of the key cap, wherein the top portion of the cushion is formed entirely within the perimeter wall, so as not to cover edges that form the top of the key cap; and
      a post structure supporting the cushion and the key cap, the post structure including a post portion extending downwardly and configured to actuate a membrane upon depression of the key;
   a housing formed of a substrate and an upper layer, the upper layer including a plurality of guide structures, each guide structure being configured to receive a respective key;
   a printed circuit board positioned in the housing above the substrate, a plurality of key switches being formed on the printed circuit board; and
   the membrane positioned above the key switches, the membrane being configured to deform and come into contact with a respective one of the key switches of the printed circuit board upon depression of a corresponding key by a user, wherein when the membrane comes into contact with the one of the key switches, the one of the key switches is actuated, causing an associated processor of the keyboard to output a signal to the computing device, which identifies that the one of the keys has been depressed.

2. The keyboard of claim 1, wherein the bottom portion of the cushion further includes a mounting portion configured to extend downward from the top portion into the void to secure the cushion to the key cap.

3. The keyboard of claim 2, wherein the mounting portion is secured to the key cap by a tongue and groove connection.

4. The keyboard of claim 3, wherein the cushion includes a flange, and the perimeter wall of the key cap includes an undercut that at least partially defines a groove, and wherein the tongue and groove connection is formed by the coupling of the flange with the groove.

5. The keyboard of claim 4:
   wherein the post structure has a base portion from which the post portion extends downwardly, and from which a support portion extends upwardly.

6. The keyboard of claim 5, wherein the base portion includes an upper surface configured to contact a lower edge of the perimeter wall.

7. The keyboard of claim 5, wherein the perimeter wall of the key cap defines a top side and an outside of the groove, and wherein the support portion defines a bottom side of the groove.

8. The keyboard of claim 1, wherein the top portion of the cushion extends to cover substantially an entire top surface of the key.

9. The keyboard of claim 1, wherein the top portion of the cushion includes a concavity.

10. The keyboard of claim 1, wherein the top portion of the cushion includes indicia positioned thereon.

11. The keyboard of claim 1, wherein the cushion is formed of an elastomeric material.

12. The keyboard of claim 1, wherein the cushion is formed of a compressible foam.

13. The keyboard of claim 1, wherein the cushion is at least partially formed of a translucent material, the keyboard further comprising:
   a light source positioned below the key to project light through the translucent material of the cushion.

14. The keyboard of claim 1, wherein the cushion and key cap are co-molded to integrally form a key-cap cushion assembly.

15. The keyboard of claim 1, wherein the cushion and key cap are molded separately.

16. A method for manufacturing a key in a keyboard for a computing device, the method comprising:
   molding a first plastic material to form a key cap of the key, the key cap having a perimeter wall and a void positioned inside the perimeter wall, the void opening to a top of the key cap, the perimeter wall including four sides;
   forming a cushion of a second deformable material within the void in the key cap, the cushion being formed to have a top portion, and a bottom portion configured to be fitted within the void, the cushion being configured to absorb an impact force directed against the key during a keystroke, and the cushion being formed in an upside down U shape having two extensions protruding from the top portion in cross section and being unsupported in a middle region to enable downward deflection of a bottom surface of the cushion, the two extensions being adjacent to an inner periphery of the perimeter wall of the key cap, wherein the top portion of the cushion is formed entirely within the perimeter wall, so as not to cover edges that form the top of the key cap;
   forming a post structure configured to support the cushion and the key cap, the post structure including a post portion extending downwardly;
   forming a surface layer on top of the top portion, the surface layer being formed of a material that has a harder surface than the deformable material, and that is suitable for printing indicia thereon; and
   printing indicia on the surface layer.

17. The method of claim 16,
wherein molding the first plastic material to form the key cap includes injecting the first plastic material into a mold to form the key cap with the perimeter wall; and
wherein forming the cushion of the second deformable material includes altering the shape of the mold to create the void inside the perimeter wall, and injecting the second deformable material into the mold to form the cushion substantially filling the void inside the perimeter wall.

18. The method of claim 16, further comprising:
wherein molding the first plastic material to form the key cap includes injecting the first plastic material into a first mold to form the key cap with the perimeter wall; and
wherein forming the cushion of the second deformable material includes:
  injecting the second deformable material into a second mold to form the cushion that is sized to substantially fill the void inside the perimeter wall; and
  assembling the cushion and the key cap after they have been removed from the first and second molds, to thereby position the cushion such that the second deformable material of the cushion substantially extends across a top portion of the key.

19. A keyboard for use with a computing device, the keyboard comprising:
a plurality of keys, each key including:
  a key cap including a perimeter wall and a void positioned within the perimeter wall and opening to a top of the key cap, the perimeter wall including four sides, the key cap further including an undercut formed on an inside of the perimeter wall;
  a cushion having a top portion configured to be contacted by a digit of a user, and a bottom portion including a flange configured to be fitted within the void such that the flange and the undercut form a tongue and groove connection, the cushion being configured to absorb an impact force directed against the key during a keystroke, the cushion formed in an upside down U shape having two extensions protruding from the top portion in cross section and being unsupported in a middle region to enable downward deflection of a bottom surface of the cushion, the two extensions being adjacent to an inner periphery of the perimeter wall of the key cap, wherein the top portion of the cushion is formed entirely within the perimeter wall, so as not to cover edges that form the top of the key cap; and
  a post structure supporting the cushion and the key cap, the post structure including a post portion extending downwardly and configured to actuate a membrane upon depression of the key;
a housing formed of a substrate and an upper layer, the upper layer including a plurality of guide structures, each guide structure being configured to receive a respective key;
a printed circuit board positioned in the housing above the substrate, a plurality of key switches being formed on the printed circuit board; and
the membrane positioned above the key switches, the membrane being configured to deform and come into contact with a respective one of the key switches of the printed circuit board upon depression of a corresponding key by a user, wherein when the membrane comes into contact with the one of the key switches, the one of the key switches is actuated, causing an associated processor of the keyboard to output a signal to the computing device, which identifies that the one of the keys has been depressed.

* * * * *

UNITED STATES PATENT AND TRADEMARK OFFICE
CERTIFICATE OF CORRECTION

PATENT NO. : 8,132,976 B2
APPLICATION NO. : 11/950439
DATED : March 13, 2012
INVENTOR(S) : Odell et al.

Page 1 of 1

Figure 8:
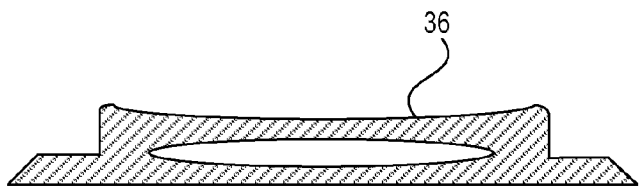
FIG. 8 is a cross sectional view of an embodiment of the cushion of the key, including a fluid filled bladder.

It is certified that error appears in the above-identified patent and that said Letters Patent is hereby corrected as shown below:

In column 3, line 4, delete "FIG. 18," and insert -- FIG. 8, --, therefor.

In column 6, line 6, in Claim 5, delete "claim 4:" and insert -- claim 4, --, therefor.

In column 7, line 11, in Claim 18, after "claim 16," delete "further comprising:".

Signed and Sealed this
Twenty-third Day of October, 2012

David J. Kappos
*Director of the United States Patent and Trademark Office*